United States Patent [19]

Bannai et al.

[11] Patent Number: 4,887,169
[45] Date of Patent: Dec. 12, 1989

[54] VIDEO SIGNAL RECORDING AND PLAYBACK APPARATUS HAVING VARIED-SPEED PLAYBACK CAPABILITY

[75] Inventors: Tatsushi Bannai; Shigeru Awamoto; Mitsuo Chiba, all of Osaka; Seishi Sasaki, Kobe, all of Japan

[73] Assignee: Matsushita Electric Industrial Co., Ltd., Osaka, Japan

[21] Appl. No.: 33,631

[22] Filed: Apr. 3, 1987

[30] Foreign Application Priority Data

Apr. 4, 1986 [JP] Japan ................................. 61-78559

[51] Int. Cl.[4] .......................................... H04N 5/783
[52] U.S. Cl. ................................. 358/335; 358/312; 360/10.3; 360/22; 360/64
[58] Field of Search .............. 360/10.1, 10.3, 11.1, 360/33.1, 64, 84, 22; 358/310, 312, 313, 330, 335

[56] References Cited

U.S. PATENT DOCUMENTS

| 4,139,867 | 2/1979 | Foerster | 360/10.3 |
| 4,268,875 | 5/1981 | Morio et al. | 358/312 |
| 4,287,539 | 9/1981 | Bixby et al. | 360/10.3 X |
| 4,400,741 | 8/1983 | Sekimoto et al. | 358/312 |
| 4,423,440 | 12/1983 | Tachi | 358/335 |
| 4,425,587 | 1/1984 | Kurata | 358/335 |
| 4,439,785 | 3/1984 | Leonard | 358/335 X |
| 4,462,049 | 7/1984 | Heitmann | 360/10.3 X |
| 4,558,376 | 12/1985 | Heitmann | 360/10.3 X |
| 4,578,718 | 3/1986 | Parker et al. | 360/10.3 |
| 4,635,134 | 1/1987 | Sasamura et al. | 360/10.3 X |
| 4,639,792 | 1/1987 | Moxon | 358/335 |
| 4,700,239 | 10/1987 | Yoshinaka et al. | 358/310 |

FOREIGN PATENT DOCUMENTS

| 0153820 | 9/1985 | European Pat. Off. . |
| 2646899 | 4/1978 | Fed. Rep. of Germany . |
| 3045543 | 7/1982 | Fed. Rep. of Germany . |
| 3142086 | 5/1983 | Fed. Rep. of Germany . |
| 3520537 | 12/1985 | Fed. Rep. of Germany . |

Primary Examiner—Alan Faber
Assistant Examiner—W. R. Young
Attorney, Agent, or Firm—Lowe, Price LeBlanc, Becker & Shur

[57] ABSTRACT

A video signal recording and playback apparatus for recording each field of a video signal as a plurality of segments on a plurality of tracks, including a circuit for inserting segment index signals after conversion of the video signal to a recording signal, to be recorded together with the recording signal to designate the respective segments. During varied-speed playback operation, the segment index signals are detected in the playback signal, and the data thus obtained are used to control the operation of a memory which temporarily stores successively produced portions of the playback signal. A playback signal can thereby be obtained by combining output signals from the memory, which will produce a satisfactory display image during varied-speed playback operation, e.g. during high-speed playback, with only simple signal processing being required.

10 Claims, 5 Drawing Sheets

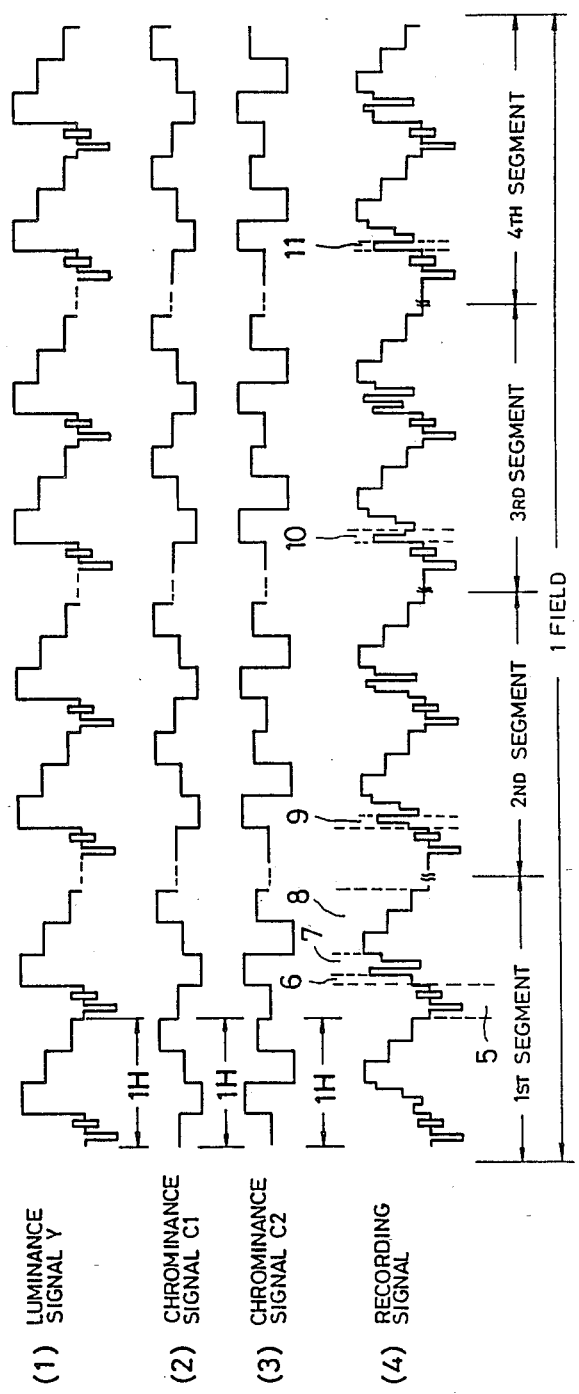

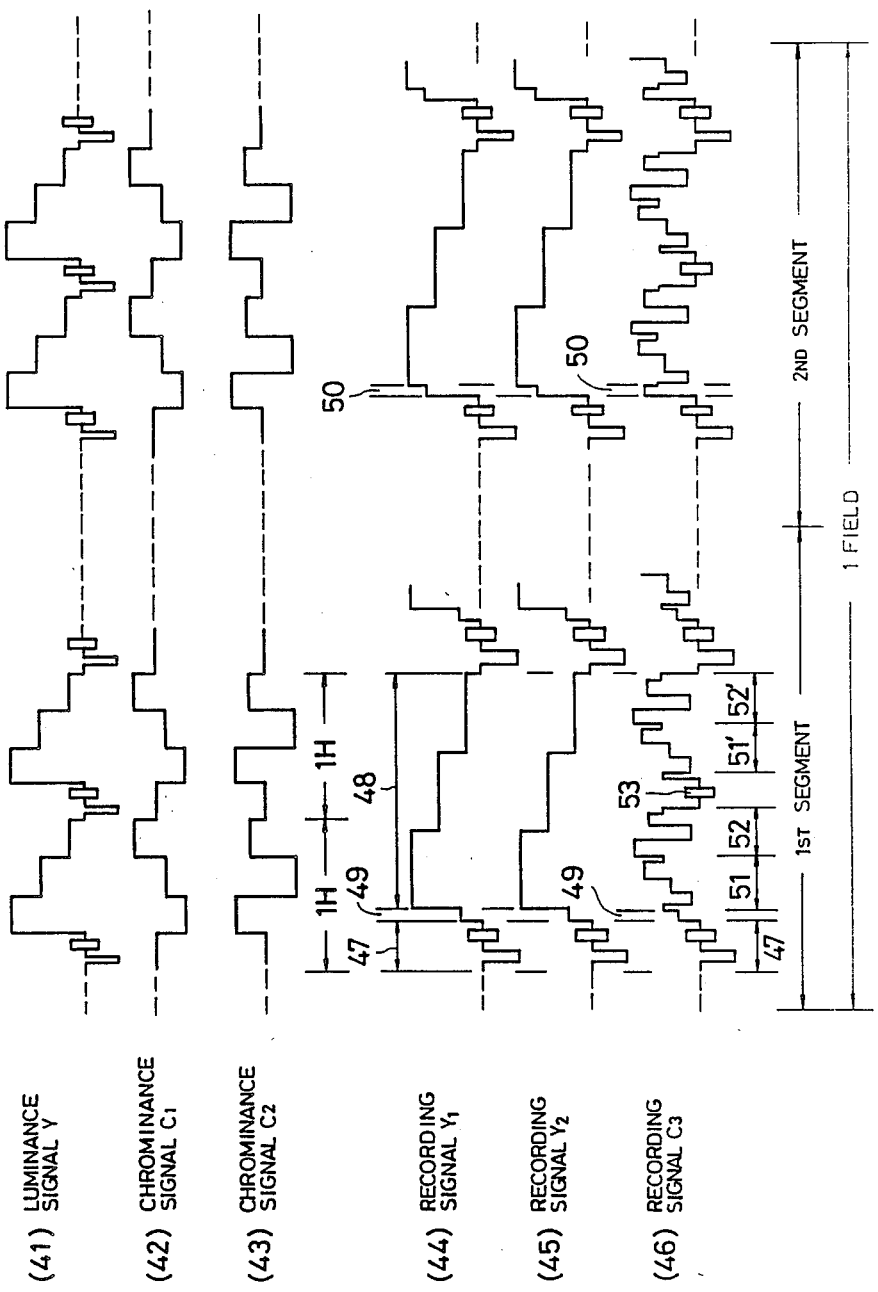

VIDEO SIGNAL RECORDING AND PLAYBACK APPARATUS HAVING VARIED-SPEED PLAYBACK CAPABILITY

BACKGROUND OF THE INVENTION

The present invention relates to a helical scan type of video tape recorder (abbreviated in the following to VTR) utilizing segment recording, whereby one field of a video signal is divided into a plurality of segments which are recorded on respective tracks of a magnetic tape, and in particular to an improved VTR for segment recording whereby a satisfactory display image is obtained from a playback signal produced during varied-speed playback operation, when the playback signal segments are intermingled in an incorrect sequence The rotary 2-head helical scan method is widely utilized as the basic operating method of video tape recorders (hereinafter referred to as VTRs) for domestic use. With that method, the speed of rotation of a rotary head cylinder (e.g. expressed in revolutions per second) is made equal to the frame frequency of the video signal (expressed in Hz), and one field of the video signal is recorded on one video track of a magnetic tape during 180° of rotation of the head cylinder.

To utilize such a VTR to record a wide-band video signal, e.g. a high-definition television signal, it is necessary to increase the relative velocity between the magnetic tape and the record/playback heads, to thereby increase the signal bandwidth of recording on the magnetic tape.

For example, if it is assumed that a wide-band video signal is to be recorded which has a bandwidth that is six times that of the NTSC standard video signal, it will be necessary to use a technique such as rotation of the head drum at a speed which is equivalent to six times the frame frequency of the video signal, or division of the video signal into two channels, with the head drum being rotated at a speed which is equivalent to three times the frame frequency. With such methods, each field of the video signal is recorded as six tracks on the magnetic tape.

A recording method of this type, whereby each field of the video signal is divided into a plurality of segments along the time axis, with the segments being respectively recorded on separate video tracks, is referred to as a segment recording method. With such segment recording, during varied-speed playback operation (e.g. operation at a playback speed which is a multiple of the standard playback speed), the heads will scan diagonally across the tracks of the magnetic tape. As a result, the positions of the segments in the playback displayed image will be displaced from the correct positions, and portions of the image (in segment units) will be intermingled. It is therefore difficult to comprehend the displayed image thus produced during varied-speed playback operation, if segment recording is used.

SUMMARY OF THE INVENTION

It is an objective of the present invention to overcome the problems described above, and to provide a video signal recording and playback apparatus whereby a wide-band video signal can be recorded by segment recording, and whereby a clearly understandable displayed image is produced during varied-speed playback operation .

To attain the above objectives, a video signal recording and playback apparatus according to the present invention includes means for inserting index information into horizontal blanking intervals of a video signal, for identifying respective segments of each field of the video signal which are recorded on respective tracks of a recording tape. During playback, this index information is detected and utilized to control the operation of a memory into which the segments in the playback signal are successively stored, to be thereafter successively read out in an appropriate sequence to constitute a video signal providing a stable display picture. Satisfactory operation is thereby ensured during both normal playback and during playback at a different speed from that utilized during recording.

More specifically, a video signal recording and playback apparatus according to the present invention is adapted for segment recording whereby one field of a video signal is recorded as N segments on a plurality of video tracks of a recording medium, where N is an integer equal to or greater than 2. The apparatus includes a component for inserting segment index signals into all (or into predetermined ones) of the horizontal blanking intervals of each of the segments, with respective ones of N different types of the segment index signals being inserted into corresponding ones of the segments.

Additionally, there is provided a structure for recording the video signal together with the segment index signals as a recording signal on the recording medium tracks, and for subsequent playback of the signals recorded on the recording medium. The recording structure included a rotary head drum having a period of rotation which is 1/N times a frame repetition period of the video signal during the recording process. Further, the inventive apparatus includes a structure for detecting the segment index signals in a playback signal produced during a varied speed mode of playback operation.

A memory is provided for temporarily storing sequentially produced portions of the playback signal and a control position controls the memory means during the varied-speed playback operation in accordance with segment index signals detected by the detection means, to produce a playback video signal from signals read out from said memory means.

BRIEF DESCRIPTION OF THE DRAWINGS

FIG. 1 is a waveform diagram showing a recording signal of a first embodiment of the present invention;

FIG. 4 is a waveform diagram of a recording signal of a second embodiment of the present invention;

DESCRIPTION OF THE PREFERRED EMBODIMENTS

Figure 2A:
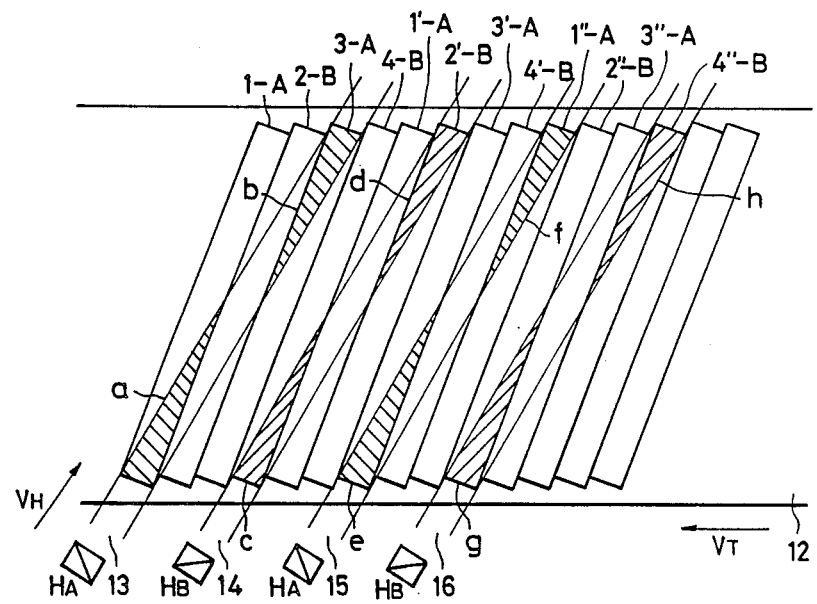
FIG. 2(a) is a diagram showing paths which are traced out by heads during triple-speed playback operation by the first embodiment of the invention.

FIG. 1 is a waveform diagram showing signals of a first embodiment of the present invention. This embodiment is applicable for example to a video signal which is produced from a video camera, consisting of a luminance signal and two chrominance signals. The luminance signal and chrominance signals are respectively subjected to time-axis compression, the two chrominance signals are then converted to a single line-sequential signal, i.e. a signal in which the portions of the two chrominance signals which occur during each horizontal scanning line of the original video signal, after being time-compressed, alternately occur sequentially. This line-sequential chrominance signal is then combined with the luminance signal by time-division multiplexing, to form a recording signal. This recording signal is then recorded on magnetic tape by 4-segment recording, utilizing a rotary head drum which rotates at a speed corresponding to four times the frame frequency of the video signal.

In FIG. 1, numeral 1 denotes the luminance signal Y of the video signal, numeral 2 denotes a first chrominance signal C1 of the video signal and numeral 3 a second chrominance signal C2, numeral 4 a recording signal formed by combining the chrominance signals (converted to line-sequential form as described above) and the luminance signal by time-division multiplexing within each horizontal scanning interval. Specifically, the Y signal 1 is subjected to time-axis compression during each horizontal scanning interval, each resultant time-compressed Y signal portion of each horizontal scanning interval of the input video signal is then inserted into a section (denoted by numeral 8) of the recording signal 4. As a result of this time-axis compression of the Y signal 1, the duration of each horizontal blanking interval of the recording signal can be increased. Before applying line-sequential sequential processing to chrominance signals C1, 2 and C2, 3 as described above, these signals are preferably subjected to vertical filtering, in order to eliminate discontinuities and noise from arising due to the process of line-sequence conversion. The time-axis compressed line-sequential chrominance signal is then inserted into sections 7 of the recording signal. The relative proportions by which time-axis compression of signals Y, 1 and C1, 2 and C2, 3 are performed are made such that the respective bandwidths of these signals in the recording signal 4 will be substantially mutually identical. A burst signal and a sync signal are inserted into each section 5 of the recording signal 4, for use as a reference during time-base correction (referred to in the following as TBC) processing during playback. Each of the segments, from the first to the fourth segment of each field includes a segment index signal which indicates the number of that segment in binary code. The first segment index signal "00" is inserted into section 6 of the first segment, the second segment index signal "01" is inserted into section 9 of the second segment, the third segment index signal "10" is inserted into section 10 of the third segment, and the fourth segment index signal "11" is inserted into section 11 of the fourth segment. The "0" and "1" states of this binary code can be respectively indicated by the white peak level and the sync tip level in the recording signal, or vice versa.

FIG. 2(a) shows the paths which are traced out by the record/playback heads of this embodiment, across the magnetic tape, during operation at three times the standard playback speed (referred to in the following as triple-speed playback operation). In FIG. 2(a), $V_T$ denotes the tape transport direction, VH denotes the direction of movement of the rotating heads, numeral 12 denotes the magnetic tape, and 1-A to 4''-B denote video tracks which are recorded on magnetic tape 12. The video tracks 1-A, 1'-A, and 1''-A are tracks on which three first segments (i.e. of three respective fields of the video signal) are successively recorded by record/playback head $H_A$, while 2-B, 2'-B, and 2''-B are tracks on which three second segments (of the aforementioned three respective fields of the video signal) are successively recorded by record/playback head $H_A$. Heads $H_A$ and $H_B$ are mounted on the periphery of the head drum, diametrically opposing and positioned at mutually different azimuth angles. Similarly, 3-A, 3'-A, and 3''-A are tracks on which three third segments of the recording signal are respectively recorded, by head $H_A$, while 4-B, 4'-B, and 4''-B are tracks on which three fourth segments of the recording signal are respectively recorded by head $H_A$. The video tracks are recorded sequentially, in the order 1-A, 2-B, 3-A, . . .

Figure 2B:
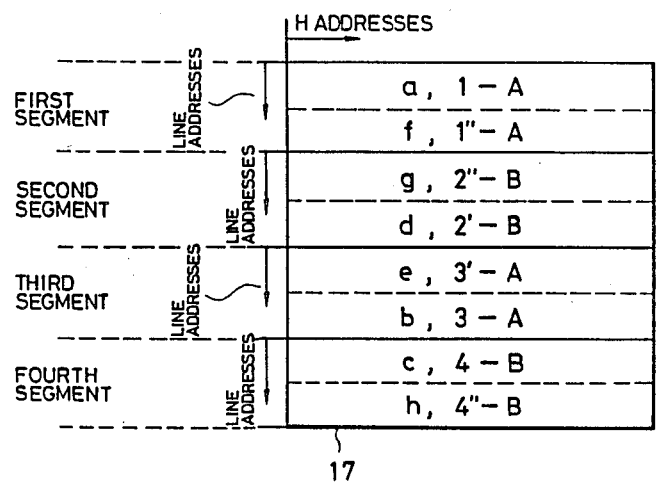
FIG. 2(b) is a diagram for illustrating an arrangement of addresses in a field memory.

FIG. 2(b) is a diagram for illustrating the manner in which the playback signal is written into a field memory 17 of this embodiment, during triple-speed playback operation, and shows how the playback signal portions a, b , . . ., g, h, shown in FIG. 2(a), are stored in field memory 17. Addresses of successive portions of each horizontal scanning line (referred to in the following as the H-addresses) are indicated along the horizontal direction, while addresses of the segments and addresses of respective horizontal scanning lines within each segment (referred to in the following as the line addresses) are indicated along the vertical direction. After these playback signal portions are written into field memory 17 in the arrangement shown in FIG. 2(b), read-out from field memory 17 is subsequently executed to produce an output playback signal which will produce a satisfactory display image. Specifically, starting at the upper left-hand corner of FIG. 2(b), the H-addresses of the first line address in playback signal portion a (i.e. beginning at the initial position of track 1-A) are sequentially read out, i.e. moving from left to right in FIG. 2(b), then the H-addresses of the second line address of portion a, and so on. The H-addresses of successive lines in playback signal portion f (from track 1''-A) are then sequentially read out in the same manner. In this way, playback data corresponding to a first segment of one field of the recording signal are read out from line memory 17. Similarly, the playback signal data of portions g, d, e, b, c, h are successively read out from field memory 17, to thereby produce playback signal data for a complete set of four successive segments, i.e. one field. In this way, although the playback signal portions which are produced from the heads during triple-speed playback operation are intermingled in an incorrect sequence and so cannot produce a satisfactory display image, a suitable output playback signal is produced from these playback signal portions by executing write-in and read-out of the signal portions to field memory 17 in a manner determined in accordance with the detected segment index signals.

Figure 3:
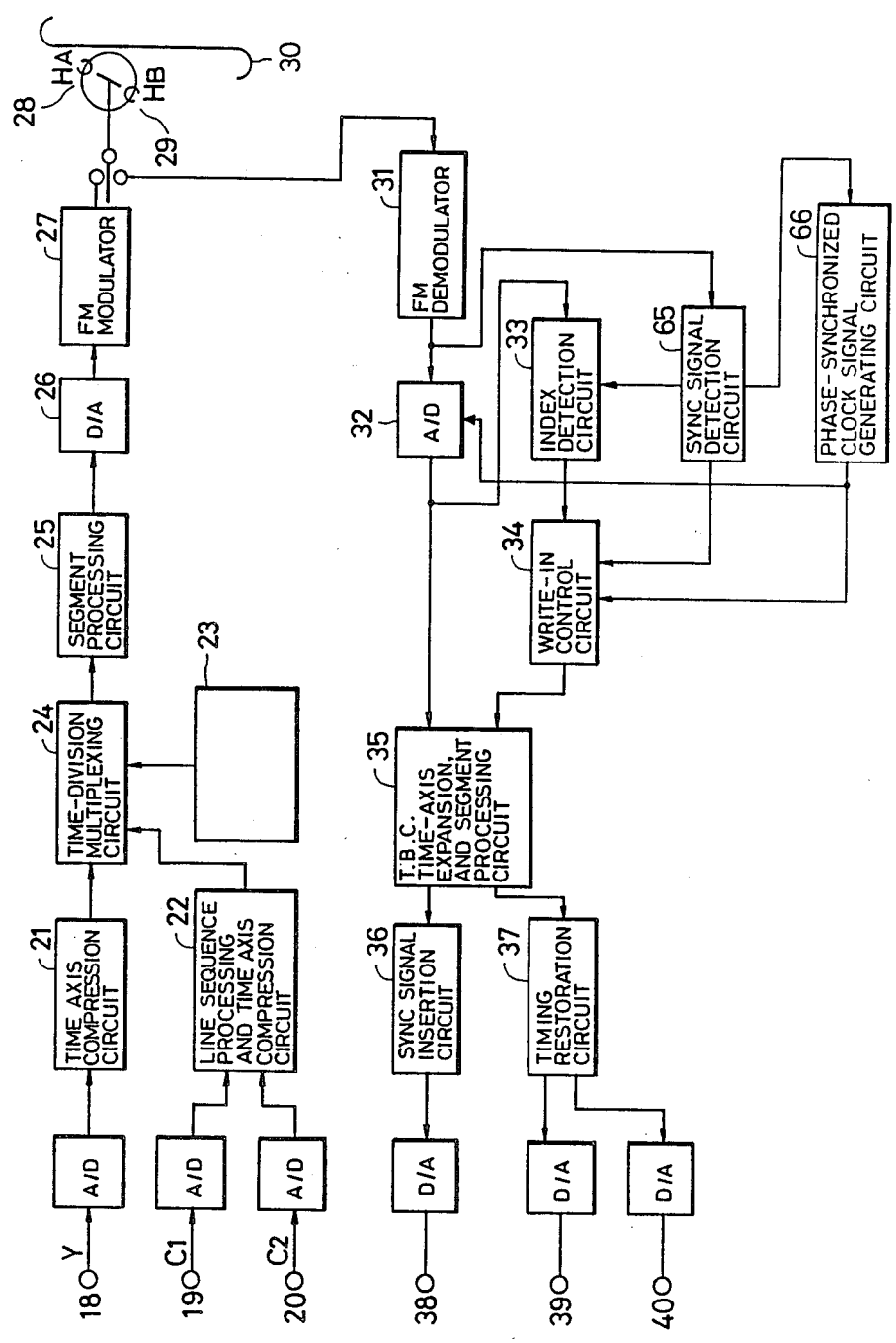
FIG. 3 is a block diagram of the first embodiment.

FIG. 3 is a block diagram of the signal processing circuits of this embodiment. Numeral 18 denotes an input terminal to which the luminance signal is applied, 19 denotes an input terminal to which chrominance signal C1 is applied, 20 denotes an input terminal to which chrominance signal C2 is applied, 21 denotes a time-axis compression circuit which includes a line memory, 22 denotes a line-sequential processing and time-axis compression circuit which includes a vertical filter and a memory, 23 denotes a sync signal and index signal generating circuit which includes a counter and ROM (read-only memory), 24 denotes a time-division multiplexing circuit which performs switching to execute time-division multiplexing of the time-axis compressed line memory, the line-sequence converted and time-axis compressed chrominance signals, sync signals and index signals, within each horizontal scanning interval. Numeral 25 denotes a segment processing circuit which consists of a delay circuit and an index and sync signal insertion circuit. Numeral 26 denotes a D/A converter for converting the recording signal to analog signal form, 27 denotes an FM modulator circuit, 28 and 29 denote recording/playback heads $H_A$ and $H_B$ respectively, mounted on a rotary head drum and spaced apart by 180°. Numeral 30 denotes a magnetic tape, 31 denotes an FM demodulator circuit, 32 denotes an A/D converter for converting a playback signal into digital signal form, 33 denotes an index signal detection circuit for detecting segment index signals contained in the playback signal. Numeral 65 denotes a sync signal detection circuit for detecting a horizontal sync signal, burst signal, and segment sync signal in the playback signal. Numeral 66 denotes a phase-synchronized clock signal generating circuit, for producing a clock signal which is synchronized in phase with the burst signal that is detected by the sync signal detection circuit 65. Numeral 35 denotes a TBC (Time Base Correction), time-axis expansion, and segment inverse processing circuit, which includes memory 17 referred to hereinabove, for temporarily storing the digitally converted playback signal. Numeral 34 denotes a write-in control circuit which utilizes the segment index signals, horizontal sync signal, segment sync signal, phase-synchronized clock signal (detected as stated above) to control the memory 17 of the TBC, time-axis expansion and inverse segment processing circuit 35. Numeral 36 denotes a sync signal insertion circuit 36 for performing insertion of the horizontal sync signal, vertical sync signal, etc, into the luminance signal of the playback signal after that signal has been expanded to the time-axis condition of the original video signal. Numeral 38 denotes an output terminal to which is supplied an output luminance signal, after conversion to analog form and sync signal insertion. Numeral 37 denotes a timing restoration circuit, for performing timing restoration of a line-sequential chrominance signal. Numerals 39 and 40 denote output terminals to which are supplied respective timing-restored chrominance signals, after digital/analog conversion of these signals.

The operation of the embodiment is as follows. The luminance signal Y, 1 which is applied to input terminal 18, is subjected to time-axis compression in units of horizontal scanning intervals, i.e. the luminance signal portion within each lH interval of the input video signal is compressed as a unit. This is performed by executing write-in of successive horizontal scanning lines to a line memory (not shown in the drawings), using a clock signal which is synchronized with a horizontal sync signal which is separated from the video signal, and executing read-out from the line memory by utilizing a clock signal which is higher in frequency than that used for write-in. The degree of time-axis compression is determined by the ratio of the frequencies of these read-out and write-in clock signals.

The chrominance signals C1, 2 and C2, 3 which are applied to input terminals 19 and 20 respectively, are subjected to 2-dimensional filtering, for example using a digital type of vertical filter, and are then converted to line-sequential form and are subjected to time-axis compression in the same way as for the luminance signal, by the line sequence processing and time-axis compression circuit 22. The sync signal and index signal generating circuit 23 serves to generate a set of signals consisting of a horizontal sync signal, a burst signal and a segment index signal, once in each horizontal scanning interval, and includes a counter and ROM (Read-Only Memory). The luminance signal, line-sequential chrominance signals, sync signal, segment index signal, etc, are then supplied to a time-division multiplexing circuit 24, to be multiplexed within each horizontal scanning interval of the recording signal. The resultant signal is then supplied to the segment processing circuit 25. The segment processing circuit 25 consists of a delay circuit, based on a line memory, a segment sync signal insertion circuit which inserts sync signals to indicate the starting position of each segment, and creates blanking intervals between successive segments by performing time axis shift processing, thereby making it unnecessary to perform head switching operations during portions of the video signal which will appear on the displayed image. A blanking sync signal is inserted into each of these blanking intervals of the first through the fourth segments, and the resultant signal, which constitutes the recording signal 4, is produced as output from the segment processing circuit 25. The recording signal 4 is then transferred through the D/A converter 26, to be converted to analog signal form, and is then supplied to FM modulator circuit 27 and to heads $H_A$, 28 and $H_B$, 29 to be recorded on the magnetic tape 30. One field of the recording signal is recorded on four video tracks of the tape, i.e. as the first to the fourth segments of that field.

During playback, the reverse operations to those described above for recording are executed. The playback FM signal which is produced from heads $H_A$, 28 and $H_B$, 29, is demodulated by the FM demodulator 31, and is then converted to digital signal form by the A/D converter 32. The demodulated playback signal from demodulator 31 is also supplied to sync signal detection circuit 65, which detects the horizontal sync signal, the burst signal and the segment sync signal in the playback signal. The phase-synchronized clock signal generating circuit 66 produces a clock signal which is phase-synchronized with the burst signal that is detected by circuit 66. Utilizing this phase-synchronized clock signal, A/D converter 32 converts the playback signal to digital form.

The resultant digital playback signal is then processed in the TBC (Time Base Corrector), time-axis expansion and inverse segment processing circuit 35, to produce a luminance signal in which the time-axis relationships are identical to those of the original input video signal, and a line-sequential chrominance signal. Circuit 35 accomplishes this by eliminating time-axis deviations in the playback signal, performing time-axis expansion of that signal, and time-shifting, by utilizing a memory (not shown in the drawing). The horizontal and vertical sync signals are then inserted into the luminance signal by the sync signal insertion circuit 36, and the luminance signal is then converted to analog signal form and supplied to output terminal 38. The line-sequential chrominance signal from circuit 35 is then converted to a pair of chrominance signals corresponding to the original chrominance signals C1 and C2, by the timing restoration circuit 37, by allocating alternate lH portions of the line-sequential chrominance signal to the two output chrominance signals. These signals are then respectively converted to analog signal form and supplied to output terminals 39 and 40.

Varied-speed playback operation will be described for triple-speed playback operation. In this case, the paths traced out over the magnetic tape by record/playback heads $H_A$ and $H_B$ will be as indicated by numerals 13, 14, 15 and 16 in FIG. 2(a). The hatched-line portions a, b,....g, h respectively denote portions of the video tracks 1-A, etc, which are played back sequentially in the order a to h. As a result of this sequence of playback of these portions of the tracks, i.e. portions of the first through the fourth segments of a field, the playback segment portions in the playback signal will be intermingled, i.e. will not be in the correct sequence in which the first to the fourth segments were originally recorded. The index detection circuit 33 serves to detect the segment index signals which were inserted prior to recording as described above, by utilizing the phase of the separated horizontal sync signal as a timing reference, and thereby distinguishes between the segment index signals of the respective segments in the playback signal, to supply a corresponding segment discrimination signal to the write-in control circuit 34. The write in control circuit 34 serves to control write-in to the field memory 17 mentioned hereinabove which is contained within the TBC, time-axis expansion and inverse segment processing circuit 35. This write-in control is executed in accordance with addresses of horizontal scanning lines within a segment (detected by counting horizontal sync signals in the playback signal, starting from a segment sync signal pulse, which indicates the starting position of a segment), referred to in the following as line addresses, and addresses of respective portions of a horizontal scanning line (obtained by counting pulses of the phase-synchronized clock signal described above), referred to in the following as H addresses. FIG. 2(b) shows the arrangement in memory 17 of the line addresses within each segment and the H addresses in each horizontal scanning line. The starting position of the H addresses in each segment corresponds to an initial point of a video track, i.e. to the starting position of the segment. The playback signal segment portions produced during triple-speed playback operation, which are intermingled as described above, are written into predetermined segment address locations and segment line address locations in the line memory by the time-division multiplexing circuit 24. One field of the playback signal is obtained by four successive head scans, indicated as 13, 14, 15 and 16 in FIG. 2(a). Read-out and write-in accessing of the line memory is performed by time-sharing operation. Thus, the stored signals portions of the first to the fourth segments of a field can be subsequently sequentially read out in the same way in which the playback signal portions having the segments intermingled were written into the line memory. In this way, signal processing of the playback signal is performed, by executing control of a memory which is capable of storing one field of the video signal, with this control being performed in accordance with the results of detecting the segment index signals contained in the playback signal.

With the above embodiment, respective index signals for each segment are inserted into the recording signal, in binary code form, and are recorded together with the recording signal. During varied-speed playback operation, the segment index signals are detected, and data obtained by this detection are used to control write-in and read-out operations of a field memory. In this way, a varied-speed playback signal which will produce a satisfactory display image can be obtained without the need for executing complex control.

In the embodiment described above, the segment index signals are in the form of binary code. The "0" and "1" values of this binary code can be expressed, in the recording signal and playback signal, as the video signal sync tip level and white peak level, respectively, for example. However it would be equally possible to utilize segment index signals each defined as one out of four possible level values. These values can consist for example of levels which successively extend from the sync tip level to the white peak level of the video signal.

Furthermore in the above embodiment, a horizontal sync signal and a burst signal are inserted into the recording signal prior to recording. However it would be equally possible to utilize the horizontal sync signal of the input video signal as a reference signal, and to record that horizontal sync signal directly, without change.

In addition, in the above embodiment, segment blanking intervals are provided in the recording signal, and segment sync signals are inserted therein. However it would be equally possible to omit this processing, and to detect the initial horizontal scanning interval of each segment by detecting the phase of rotation of the rotary head drum during playback operation.

Moreover in the above embodiment it is assumed that the input video signal consists of a luminance signal and two chrominance signals, produced from a video camera. However it would be possible to apply this embodiment to an NTSC, PAL or SECOM standard video signal, by executing decoding of the signal to obtain a luminance signal and two chrominance signals.

Furthermore in the embodiment described above, digital processing of the playback signal is performed. However it would be equally possible to apply analog processing of the playback signal, i.e. by employing an analog memory to perform the function of field memory 17 of the above embodiment, etc.

FIG. 4 is a waveform diagram of a recording signal of a second embodiment of the present invention. In this embodiment, a luminance signal component of the input video signal is subjected to time-axis expansion, and is converted into two luminance signal channels, while two chrominance signal components of the video signal are respectively subjected to time-axis compression and are converted to a single chrominance signal channel by time-division multiplexing. A recording signal consisting of three signal channels is thereby produced. The process of recording with this embodiment, by 3-channel 2-segment recording will be described in the following. A rotary head drum is utilized on which are mounted a pair of head blocks, designated as $H_A$, 61 and $H_B$, 62 respectively, each head block consisting of three heads. The head drum is rotated with a period of rotation equal to ½ of the frame repetition period of the input video signal (assuming an interlace video signal with two fields per frame).

In FIG. 4, numeral 41 denotes a luminance signal Y, while numerals 42 and 43 respectively denote two chrominance signals C1 and C2. The luminance signal 41 is subjected to time-axis expansion by a factor of approximately 2, in units of horizontal scanning intervals (i.e. 1H intervals), and is then divided into two channels in which each of the time-expanded 1H portions of the original luminance signal is contained within a section 48 of one of the two channel recording signals. The two channel recording signals are respectively designated as Y1, 44 and Y2, 45. The chrominance signals C1, 42 and C2, 43 are respectively subjected to time-axis compression, to be compressed to approximately ½ of the time duration in the original video signal. Time-division multiplexing is then applied to the time-axis compressed chrominance signals, and the C1, 42 chrominance signal portions contained in each pair of successive 1H intervals of the original video signal are then inserted into sections 51 and 51' respectively of the horizontal scanning intervals of the recording signal C3, 46, while the C2, 43 chrominance signal portions contained in each pair of successive 1H intervals of the original video signal are inserted into sections 52 and 52' of the recording signal C3, 46. In this way, the chrominance signal portions of a pair of 1H intervals of the original video-signal are contained within one 1H interval of the recording signal C3. A burst signal 53 is inserted between the two pairs of chrominance signal signal sections 51, 52' and 51' 52' to serve as a position reference for these pairs of chrominance signal sections within the recording signal. A sync signal and a burst signal are also inserted, into the intervals 47 of each of the three recording signals 44, 45 and 46, for use in TBC operation during playback. Segment index signals, respectively differing in level in accordance with each segment, are inserted into section 49 of each first segment, and section 50 of each second segment of a field.

Although not shown in FIG. 4, this embodiment also includes a delay circuit for performing time axis shift processing whereby a segment blanking interval is inserted into each segment. First and second blanking sync signals are then inserted into the respective segment blanking intervals of the first and second segments.

Figure 5A:
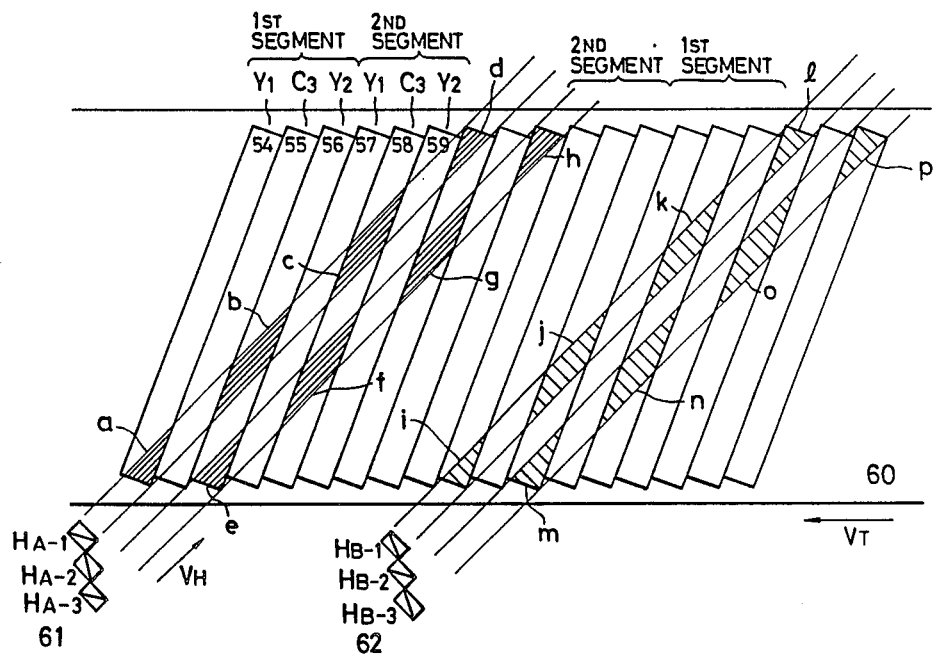
FIG. 5(a) is a diagram showing paths which are traced out by heads during triple-speed playback operation by the second embodiment of the invention.

The operation of this embodiment is as follows. A rotary head drum is utilized for recording, which rotates at a speed corresponding to twice the frame frequency of the input video signal (assuming two fields per frame of the video signal). Two head blocks denoted as $H_A$, 61 and $H_B$, 62 are mounted at mutually opposing positions on the head drum, with each head block consisting of three heads for respectively recording the three channel signals 44, 45 and 46. In each of the head blocks $H_A$ and $H_B$, the three heads are arranged as a central head and two outer heads, with the central head and the two outer heads having respectively different azimuth angles. The central head of block $H_A$ has the same azimuth angle as the outer heads of block $H_B$. FIG. 5a shows the video tracks which are formed on the magnetic tape by recording with such an arrangement of heads. In FIG. 5a, numeral 60 denotes a magnetic tape, 54, 55 and 56 respectively denote video tracks of first segments of the recording signal, 57, 58 and 59 respectively denote video tracks of second segments of the recording signal. The recording signal Y1, 44, is recorded on track 54, recording signal C3, 46 is recorded on track 55, and recording signal Y2, 45 is recorded on track 56, whereby a first segment is recorded on three successive tracks. Similarly, recording signal Y1, 44 is recorded on track 57, recording signal C3, 46 on track 58, and recording signal Y2, 45 on track 59, whereby a second segment is recorded, thereby completing recording of one field of the original video signal. In this way, recording is executed on mutually adjacent video tracks by heads which have mutually different azimuth angles, while two of the three video signal channels of one segment (i.e. the luminance signal Y1 and Y2) are recorded by heads which have the same azimuth angle. Furthermore, the first segment signals Y1 and Y2 are recorded by heads having a different azimuth from the heads which record the second segment signals Y1 and Y2.

Playback operation is the inverse process to the recording operation described above. After time-axis error correction of the two channel luminance playback signals Y1 and Y2 has been performed, these signals are subjected to time-axis compression by a factor of approximately 2, and are combined into a single channel to be produced as an output luminance signal of the playback video signal. The single-channel chrominance playback signal C3 has time-axis error correction applied, and is then subjected to time-axis expansion by a factor of approximately 2, and converted into two chrominance signals C1 and C2, to be produced as output chrominance signals of the playback video signal.

Figure 5B:
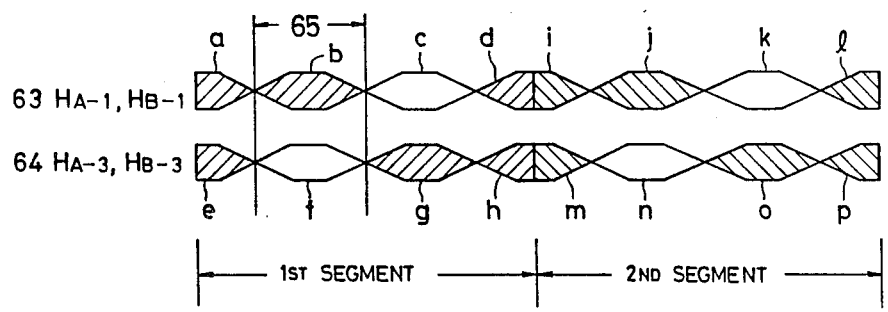
FIG. 5(b) is a waveform diagram of output signals of respective luminance signal channels during triple-speed playback operation by the second embodiment.

FIG. 5(a) shows the paths traced out by the heads across the magnetic tape during triple-speed playback operation with this embodiment. In FIG. 5(a), $V_H$ denotes the head movement direction, $V_T$ denotes the tape transport direction, the hatched-line portions a, b,...q, p denote the portions of video tracks which are played back through the channels allocated to the two line-sequential. FIG. 5(b) shows the playback signal which is produced from a pair of heads $H_A$-1, $H_B$-1 and $H_A$-3, $H_B$-3 of the head blocks $H_A$, 61 and $H_B$, 62, i.e. the head pairs of the two channels to which the line-sequential Y1 and Y2 have been respectively allocated. In FIG. 5(b), numeral 63 denotes the playback signal produced from the pair of heads $H_A$-1 and $H_B$-1 that are allocated to signal Y1, while 64 denotes the playback signal produced from the pair of heads $H_A$-3 and $H_B$-3 that are allocated to signal Y2.

The hatched-line portions shown in FIG. 5(b) denote playback signal portions which are produced during the head scanning interval of the first segment, and the playback signal portions produced during the head scanning interval of the second segment. The portions which are not hatched indicate other segments of the playback signal.

For example, playback signal portion a forms part of the Y1 signal of the first segment, portion b forms part of the Y2 signal of the first segment, c forms part of the C3 signal of the second segment. Discrimination between segments in the playback signal is accomplished by using the phase of the burst signal as a reference, and detecting the levels of the segment index signal which are inserted at predetermined positions in the playback signal.

During section 65 of signals 63 and 64, playback signal portions b and f are produced from heads $H_A$-1 and $H_A$-3 respectively. However portion f (which is part of the chrominance signal channel C3 in the second segment shown in FIG. 5(a)) is omitted from the output playback luminance signal. Thus, of the two luminance signal channels Y1 and Y2, only playback signal portion b of channel Y2 in the first segment is utilized in the playback luminance signal. Similarly, playback signal portion g is utilized, while portion c is omitted. In this way, intermingling of chrominance playback signal portions with luminance signal portions is prevented. Thus, during intervals such as section 65 in FIG. 5(b), the luminance signal component of the playback signal is derived from only one out of every two successive horizontal scanning lines of the original video signal.

This is equivalent to drop-out of playback signal portion, such as portion f. However this portion is replaced by playback signal portion b from the succeeding segment of the original recording signal, executed in the same way as for usual drop-out processing, with this drop-out processing being performed in accordance with the results of detecting the segment index signals. This will of course result in the vertical resolution of the playback luminance signal being reduced to approximately ½ of that of the original video signal. Furthermore, since as stated above the C3 chrominance signal portions of a segment which are played back are not combined with the playback luminance signal portions of that segment (in channels Y1, Y2), no problems will arise in this respect.

With the embodiment of the present invention described hereinabove, a luminance signal of a video signal is subjected to time-axis expansion by a factor of 2, in units of horizontal scanning intervals, and is then divided into two signal channels. The two chrominance signals of the video signal are subjected to time-axis compression, and are combined into a single signal channel. Segment index signals are then inserted into respective segments of the three channel signals, and 3-channel 2-segment recording is performed. In this way, the respective segments can be readily distinguished during varied-speed playback operation, so that omission of luminance signal portions of the playback signal can be handled by utilizing a memory and drop-out processing in the same way in which usual drop-out processing is executed. Each omitted luminance signal portions can thereby be replaced by a corresponding luminance signal portion within a corresponding succeeding segment. More generally, this embodiment employs segment recording and playback through M signal channels, where M is an odd integer which is equal to or greater than three. During an interval in which an n'th segment is scanned as a result of rotation of the head drum, where n is equal to 1 or 2, playback signals of all of channels other than a playback signal of a channel containing the n'th segment are replaced by the playback signal of the channel containing the n'th segment, to form a playback video signal. A satisfactory playback luminance signal can thereby be produced, which is capable of providing a clearly understandable display image, during varied-speed playback operation.

The second embodiment of the invention described above has the advantage that only a small amount of memory capacity is required in order to process the playback signals from the heads to produce an output video signal, i.e. a line memory (capable of storing one horizontal scanning line) can be utilized, rather than a large-capacity field memory such as is required with the first embodiment described hereinabove. Furthermore the playback signal processing which is required during varied-speed playback operation is extremely simple, i.e. basically consisting of periodically replacing an omitted portion of one channel of the playback signal with a portion of another channel, with this replacement being executed by substantially real-time operation.

With the present invention, as described above, segment index signals corresponding to respective segments are inserted into horizontal blanking intervals of a recording signal during segment recording of a video signal, and are recorded together with the video signal. During varied-speed playback operation, these segment index signals are detected, and control of a memory is executed in accordance with the detected segment index signals such as to synthesize a playback video signal. In this way, the invention enables a satisfactory display image to be obtained during varied-speed playback operation by utilizing only simple signal processing, so that the invention has great practical significance.

What is claimed is:

1. A video signal recording and playback apparatus including means for operation in a varied speed playback mode and adapted for segment recording whereby one field of a video signal is recorded as N segments on a plurality of video tracks of a recording medium, where N is an integer equal to or greater than 2, the apparatus comprising:

means for inserting segment index signals into predetermined ones of horizontal blanking intervals of each of said segments, with respective ones of N different types of said segment index signals being inserted into corresponding ones of said segments;

means for recording said video signal together with said segment index signals as a recording signal on said recording medium tracks, and for subsequent playback of said recording medium, said recording means comprising a rotary head drum having a period of rotation which is 1/N times a frame repetition period of said video signal during said recording;

means for detecting said segment index signals in a playback signal produced during said varied speed mode of playback operation;

memory means for temporarily storing sequentially produced portions of said playback signal, and;

means for controlling said memory means during said varied-speed playback operation in accordance with segment index signals detected by said detection means, to produce a playback video signal from signals read out of said memory means.

2. A video signal recording and playback apparatus according to claim 1, in which said control means functions during said varied speed playback operation to control write-in of said playback signal portions to said memory means and subsequent read-out of said signal portions in accordance with results of said segment index signal detection and to combine said playback signal portions read out from said memory means, to produce said playback video signal.

3. A video signal recording and playback apparatus according to claim 1, in which said N different types of segment index signal are respectively expressed as N signal level values, which are within a range of levels extending from a sync tip level to a white peak level of said recording signal.

4. A video signal recording and playback apparatus as recited in claim 1, further comprising means for establishing a speed of rotation for the rotary head drum to have a period of rotation which is 1/N times said frame repetition period.

5. A video signal recording and playback apparatus including means for operation in a varied speed playback mode and adapted for segment recording whereby one field of a video signal is recorded as N segments on a plurality of video tracks of a recording medium, where N is an integer equal to or greater than 2, the apparatus comprising:

means for inserting segment index signals into predetermined ones of horizontal blanking intervals of each of said segments, with respective ones of N different types of said segment index signals being inserted into corresponding ones of said segments;

means for recording said video signal together with said segment index signals as a recording signal on said recording medium tracks, and for subsequent playback of said recording medium, said recording means comprising a rotary head drum having a period of rotation which is 1/N times a frame repetition period of said video signal during said recording;

means for detecting said segment index signals in a playback signal produced during said varied speed mode of playback operation;

memory means for temporarily storing sequentially produced portions of said playback signal, and;

means for controlling said memory means during said varied-speed playback operation in accordance with segment index signals detected by said detection means, to produce a playback video signal from signals read out of said memory means;

in which said N different types of segment index signal are respectively expressed in binary code, and in which "0" and "1" values of said binary code correspond to a sync tip level and a white peak level of said recording signal.

6. A video signal recording and playback apparatus adapted for segment recording whereby a video signal is converted to a recording signal and one field of said video signal is recorded as N segments on a plurality of video tracks of a recording medium, where N is an integer equal to or greater than 2, the apparatus comprising:

means for forming a segment blanking interval in each of said segments in said recording signal;

means for inserting a segment sync signal into each of said segment blanking intervals;

means for inserting a horizontal sync signal, a burst signal, and a segment index signal into each horizontal blanking interval of said recording signal, said segment index signals respectively varying in accordance with said segments;

means for recording said video signal together with said segment index signals as a recording signal on said recording medium tracks, and for reproducing the recorded signals, said recording means comprising a rotary head drum having a period of rotation which is 1/N times a frame repetition period of said video signal during said recording;

means for detecting said horizontal sync signals, said segment sync signals and said burst signals in a playback video signal produced during playback operation;

means for detecting said segment index signals in said playback video signal;

means for generating a clock signal which is synchronized in phase with said detected burst signal;

means for converting said playback signal to digital form;

memory means for temporarily storing said playback signal after digital conversion;

means for controlling said memory means at least in accordance with results of detection of said segment sync signals, said horizontal sync signals, said segment index signals and with said phase-synchronized clock signal, and;

means for converting output signals produced from said memory means to analog form, to produce a playback video signal.

7. A video signal recording and playback apparatus according to claim 6, in which said memory means is capable of storing at least one field of said video signal, and in which control of said memory means is performed in accordance with segment addresses which are expressed by results of detection of said segment index signals, line addresses which are obtained by counting pulses of said horizontal sync signals beginning from a segment sync signal which expresses a starting position of one of said segments, and addresses of portions of horizontal scanning lines on said video signal which are obtained by counting pulses of said phase-synchronized clock signal beginning from a horizontal sync signal which expresses a starting position of a horizontal scanning line.

8. A video signal recording a playback apparatus adapted for segment recording whereby a video signal is converted to a recording signal and one field of said video signal is recorded as a plurality of segments on a plurality of video tracks of a recording medium, the apparatus comprising:

means for converting said recording signal into M channels, where M is an odd-numbered integer which is equal to or greater than 3;

means for inserting segment index signals into predetermined ones of the horizontal blanking intervals of each of said recording signal channels, with respectively different ones of said segment index signals being inserted into corresponding ones of said segments;

means for simultaneously recording said M recording signal channels by means of recording heads mounted on a rotary head drum, said recording heads being mounted on said head drum such that mutually adjacent ones of said video tracks are formed by respective ones of said recording heads which have mutually different azimuth angles, said head drum being rotated at a frequency which is twice the frame frequency of said video signal;

means for detecting said segment index signals in playback signals of said M channels during a varied-speed playback operation;

memory means comprising M channels, for temporarily storing said M playback signal channels;

means for controlling said memory means in accordance with results of said segment index signal detection such that during a scanning interval in which an nth segment is scanned by said heads, where n is equal to 1 or 2, playback signals of all of said channels other than a playback signal of a channel containing said nth segment are replaced by said playback signal of the channel containing said nth segment, and;

means for combining output signals from the M channels of said memory means into a signal channel to produce a playback video signal.

9. A video signal recording and playback apparatus according to claim 8, in which said memory means is capable of storing at least one horizontal scanning line of said video signal and in which said memory means is controlled during temporary storage of said playback signals in accordance with results of detection of said segment index signals.

10. A video signal recording and playback apparatus having playback means including a varied speed playback mode, and adapted for segment recording, comprising:

means for converting a video signal into a recording signal for recording one field of said video signal as two segments on a plurality of video tracks of a recording medium, and for converting said recording signal into M channels, where M is an odd-numbered integer which is equal to or greater than 3;

means for inserting a segment index signal into horizontal blanking intervals of said M channel recording signals, with respectively different ones of said segment index signals being inserted into corresponding ones of said segments;

means for recording said M recording signal channels on said recording medium, comprising recording heads mounted on a rotary head drum which is rotated with a period of rotation equal to one half of a frame repetition period of said video signal, said recording being executed such that mutually adjacent ones of said video tracks are formed by respective ones of said recording heads which have mutually different azimuth angles;

means for detecting said segment index signals in playback signals of said M channels during a varied-speed playback operation;

means for converting playback signals of said M channels produced during the playback operation into digital signal form;

memory means comprising M channels, for temporarily storing said M channels of playback signals after digital conversion;

means for controlling said memory means in accordance with results of detection of said segment index signals in the playback signals, such that during a scanning interval in which an nth segment is scanned by said heads, where n is equal to 1 or 2, playback signals of all of said channels other than a playback signal of a channel containing said nth segment are replaced by said playback signal of the channel containing said nth segment;

means for combining output signals from the M channels of said memory means into a single channel playback signal, and;

means for performing analog conversion of said single channel playback signal to produce a playback video signal.

* * * * *